United States Patent [19]

Ide et al.

[11] Patent Number: 4,824,424

[45] Date of Patent: Apr. 25, 1989

[54] BELT FOR A BELT DRIVE DEVICE

[75] Inventors: Tohru Ide; Mitsugu Satoh, both of Tokyo, Japan

[73] Assignee: Fuji Jukogyo Kabushiki Kaisha, Tokyo, Japan

[21] Appl. No.: 139,655

[22] Filed: Dec. 30, 1987

[30] Foreign Application Priority Data

Aug. 24, 1987 [JP] Japan .............................. 62-209826
Aug. 24, 1987 [JP] Japan .............................. 62-209827

[51] Int. Cl.$^4$ ............................................. F16G 5/16
[52] U.S. Cl. .................................. 474/242; 474/201; 474/272
[58] Field of Search ............... 474/201, 237, 240, 242, 474/244, 272

[56] References Cited

U.S. PATENT DOCUMENTS

| 4,516,963 | 5/1985 | Mott | 474/201 |
| 4,525,159 | 6/1985 | Filderman et al. | 474/201 |
| 4,650,444 | 3/1987 | Sakakibara et al. | 474/242 X |

FOREIGN PATENT DOCUMENTS 61-270535  11/1986  Japan .

Primary Examiner—Thuy M. Bui
Attorney, Agent, or Firm—Martin A. Farber

[57] ABSTRACT

A belt for a belt drive device is composed of a plurality of metal elements arranged on a pair of carriers. The elements consist of two or more kinds which are divided along thickness. The mixing ratio of the thinner element to the thickest element is less than fifty percent, and the elements are arranged at random.

16 Claims, 5 Drawing Sheets

BELT FOR A BELT DRIVE DEVICE

BACKGROUND OF THE INVENTION

The present invention relates to a belt for a belt drive device, and more particularly to a belt for a continuously variable belt-drive transmission for a motor vehicle.

A known continuously variable belt-drive transmission disclosed in U.S. Pat. No. 4,369,675 comprises an endless belt running over a drive pulley and a driven pulley. Each pulley comprises a movable conical disc which is axially moved by a fluid operated servo device so as to vary the running diameter of the belt on the pulleys in dependency on driving conditions.

The belt comprises a plurality of metal elements adjacently arranged in the longitudinal direction of the belt, and a pair of endless carriers inserted in opposed slits of each element.

When the belt enters or leaves the pulleys, the alignment of the elements is distorted, causing misalignment of elements. Such deviations of the elements generate noise. One of the causes of the noise is that the elements strike against the pulleys. Another is that when inclination of an element to the adjacent element changes, elements bump against each other, or a gap between the adjacent elements is increased or decreased as a result of the change of the inclination so that air in the gap vibrates and oil splashes.

For example, in the case of a belt which is composed of elements each having a thickness of 2.2 mm and has a length of 589 mm, the frequency of noise is in a range between 2 and 10 kHz. The noise corresponds to the frequency of elements at a time when passing a certain point in the course of the belt. For example, when the speed of the belt is 5 m/sec, and the thickness of the elements is 2.2 mm, the frequency is 5000/2.2 = 2272.72. Namely, the most commonly heard noise is 2.27 kHz. Namely, when elements have the same thickness, timing of the elements passing the certain point is constant so that sound pressure level becomes high. The sound pressure level can be decreased by changing the timing. The change of the timing can be achieved by providing a variety of the thickness of elements in a belt.

Accordingly, a belt comprising elements of two or more kinds which are different in thicknesses has been proposed in Japanese Patent Laid Open No. 61-270535 to reduce the noise. However, the prior art does not disclose differences of the thicknesses of the elements nor the combinations thereof.

On the other hand, from a production managing point of view, it is preferable to manufacture the belt with elements, the thicknesses of which are divided into a small number of types. Furthermore, in order to decrease the distortion of the belt and to prevent the carrier from excessively bending when the elements are unstable, elements are preferably formed as thin as possible provided that the strength of the element can be maintained. Accordingly, it is desirable for the difference between the thicknesses to be small.

SUMMARY OF THE INVENTION

The object of the present invention is to provide a belt for a belt drive device where noises are effectively reduced without the strength of the element deteriorating.

The other objects and features of this invention will become understood from the following description with reference to the accompanying drawings.

BRIEF DESCRIPTION OF THE DRAWINGS

FIG. 1b is a schematic cross section of the belt device of FIG. 1a;

DETAILED DESCRIPTION OF THE PREFERRED EMBODIMENTS

Figure 1A:
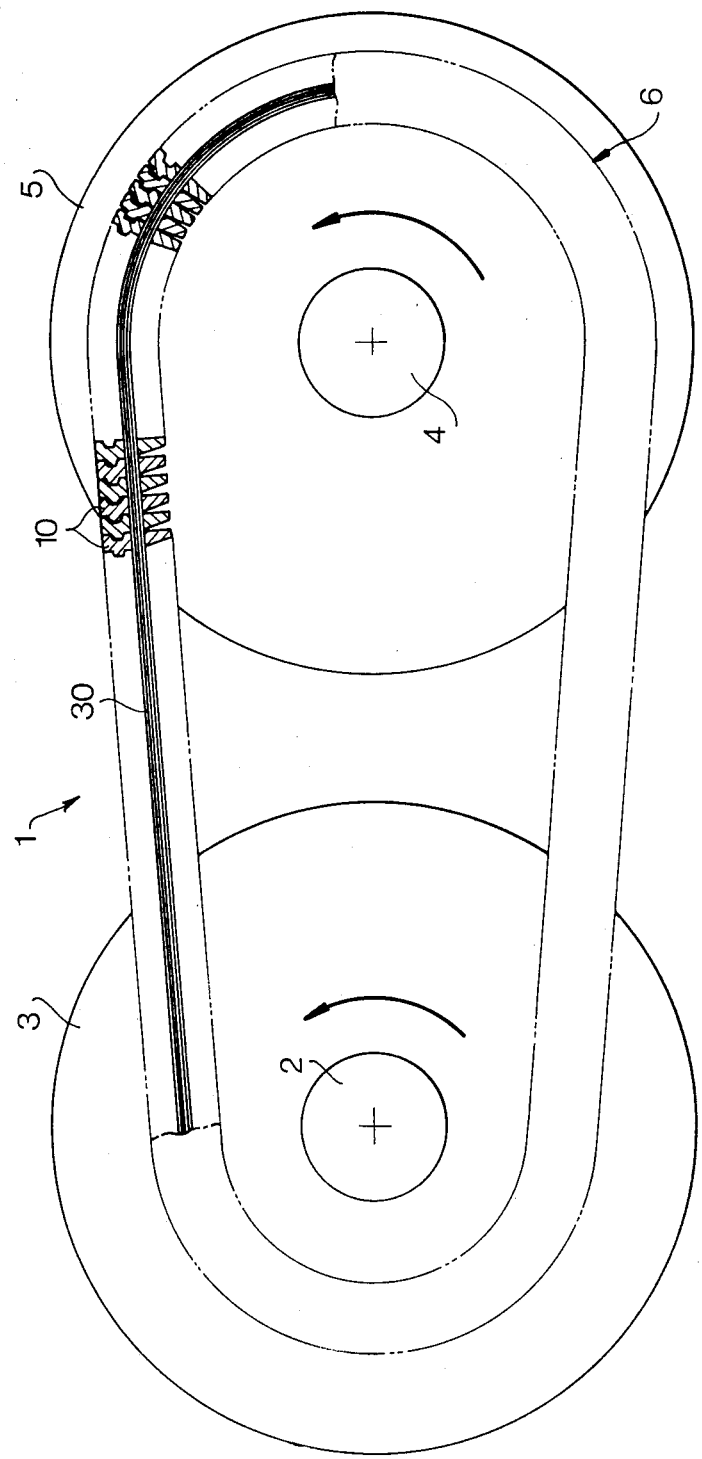
FIG. 1a is an elevational view of a belt device.
Figure 1B:
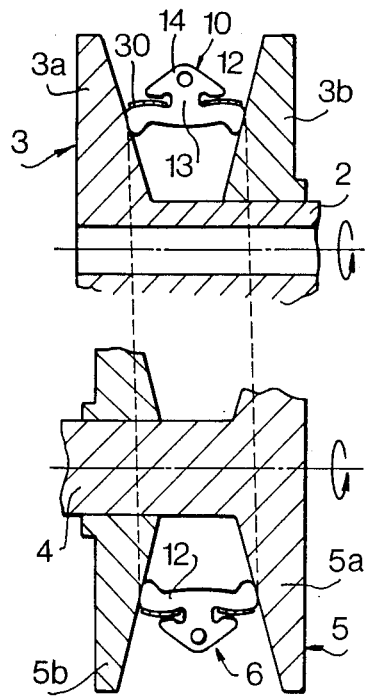
Figure 2:
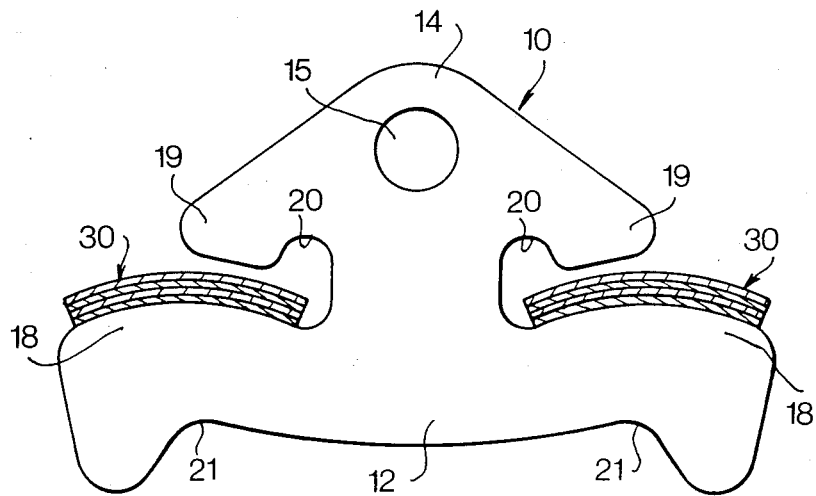
FIG. 2 is an elevational view of an element of a belt according to the present invention.

Referring to FIGS. 1a, 1b and 2, a belt-device 1 to which the present invention is applied, has an input shaft 2 and an output shaft 4 provided in parallel with the input shaft 2. A drive pulley 3 and a driven pulley 5 are mounted on shafts 2 and 4 respectively. A fixed conical disc 3a of the drive pulley 3 is integral with input shaft 2 and an axially movable conical disc 3b is axially slidably mounted on the input shaft 2. A conical face of the fixed conical disc 3a confronts a conical face of the movable conical disc 3b thereby forming a groove therebetween.

A fixed conical disc 5a of the driven pulley 5 is formed on the output shaft 4 opposite a movable conical disc 5b. Conical faces of the respective discs 5a and 5b form a groove. A belt 6 engages the drive pulley 3 and the driven pulley 5.

The belt 6 comprises a plurality of metal elements 10 adjacently arranged in the longitudinal direction of the belt. Each element has a body portion 12, a head portion 14, a pillar portion 13 at the center and a pair of horizontal slits at both sides thereof, between the body portion 12 and head portion 14. A pair of metal carriers 30 are inserted in the slits.

Figure 3:
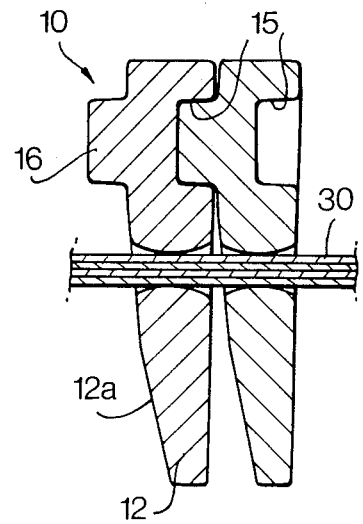
FIG. 3 is a sectional view of the elements.

As shown in FIG. 3, the thickness of the body portion 12 becomes smaller toward the bottom end, thereby forming an inclination 12a under a pitch line. Thus, the elements 10 can pass around the pulleys. The body portion 12 has shoulders 18 at the lateral sides and the head portion 14 has ears 19 at lower side portions, each corresponding to the shoulder 18. Each shoulder 18 and ear 19 are arranged so as to engage with the carriers 30. A recess 20 is formed on each side of the pillar portion 13 so as to prevent the carrier 30 from rubbing the pillar portion 13. A recess 21 is formed on the bottom of the body portion 12 thereby balancing the distribution of pushing force exerted on the elements 10.

The carrier 30 comprises laminated layers of flexible thin strips so that bending stress which occurs when the carrier 30 passes over the pulley having a small effective radius, is decreased.

Each element 10 has a projection 16 on one side and a dimple 15 on the other side. The projection 16 of one element 10 engages with the dimple 15 of the adjacent element with a small gap therebetween and all elements are arranged side by side. The belt 6 is thus assembled.

In order to determine the difference the thicknesses of the elements 10, mixing ratios and distribution of the elements appropriate for reducing noise, an experiment was carried out using two kinds of elements $E_1$ and $E_2$ distributed at random. The elements $E_1$ and $E_2$ have different thicknesses $t_1$ and $t_2$ each of which is a value at a maximum thickness portion of the element.

The following table shows whether the reduction of noise was detected by human senses in two examples. Thickness $t_1$ of the elements $E_1$ in both examples was 2.2 mm, which is the thickness of a conventional element. Thicknesses $t_2$ in example I and II are 2.1 mm and 2.0 mm, respectively. The percentage of the elements $E_2$ ranges from 10 to 50% of the total number of elements. A ratio r of the difference of the thicknesses between elements $E_1$ and $E_2$ can be obtained from $r = (t_1 - t_2)/t_1$.

TABLE

| Percentage (P) of Elements $E_2$ (%) | Ratio (r) Table of Difference of Thicknesses (Thickness of Elements $E_2$ (mm)) | |
|---|---|---|
| | Example I 0.045 (2.1 mm) | Example II 0.09 (2.0 mm) |
| 10 | NO | NO |
| 20 | — | YES |
| 30 | NO | YES |
| 40 | — | YES |
| 50 | NO | YES |

Figure 4:
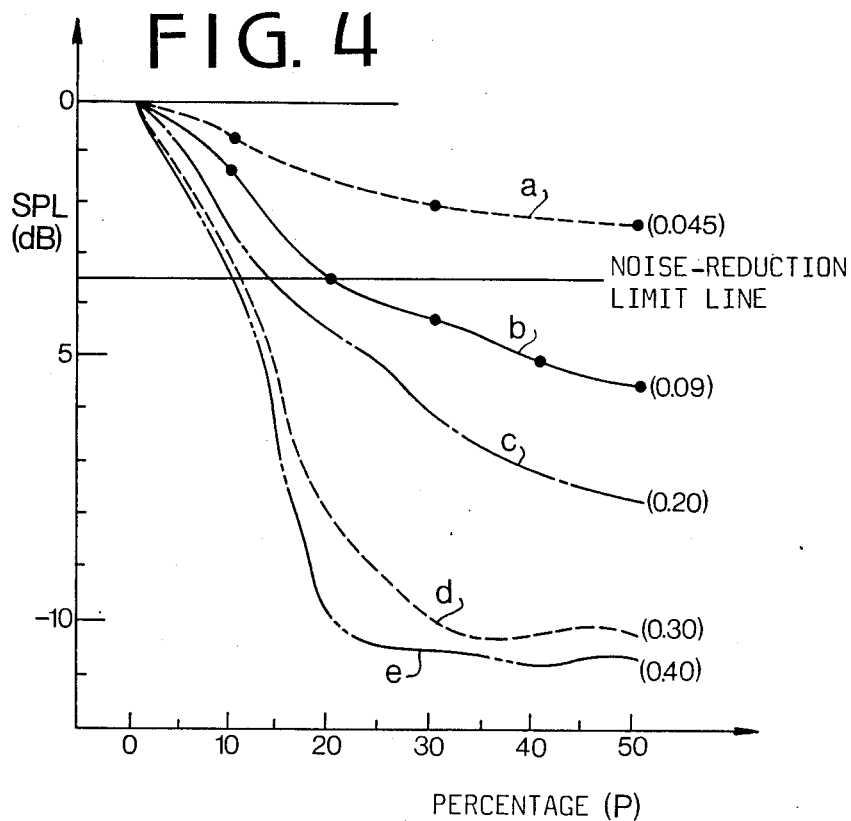
FIG. 4 is a graph showing peak sound pressure levels in relation to mixing ratios when two kinds of elements are mixed.

Peak values of sound pressure level (SPL) of frequencies of various combinations of elements are calculated by fast Fourier transform and shown by lines a to e in FIG. 4. Points on lines a and b indicate percentages and levels which were actually experienced in the experiment as described in the table, and lines c to e are based solely on calculations. The limit of the peak SPL for sufficiently reducing the noises is −3.5 db. The noise decreases as the ratio r of thickness difference increases. Accordingly, the ratio r of the thickness difference of the elements $E_1$ and $E_2$ must be larger than approximately 0.05 and the percentage of the second element $E_2$ must be more than 10%. When the ratio r exceeds 0.3 or the percentage of the second element exceeds 50%, the effect of the noise reduction becomes substantially constant. It was found that the noise is not decreased at all if the two kinds of elements are alternately arranged compared with a belt comprising a single kind of element. Thus, the elements must be arranged at random in accordance with the table of random numbers.

When the belt comprises three or more kinds of elements, it can be determined whether the noise of the belt is sufficiently decreased by the following calculations. Supposing that among n kinds of elements $E_1$ to $E_n$, the thickest elements $E_1$ are the largest percentage in number, and the ratio r of difference of thickness $t_i$ of a certain element $E_i$ to the thickness $t_1$ of the thickest element is calculated, as follows:

$$r = (t_1 - t_i)/t_1.$$

A minimum ratio $r_m$ is the ratio between the thickest element $E_1$ and the subordinate element $E_2$. Percentage $P_i$ of the element $E_i$ is then calculated as follows.

$$P_i = a_i/A \times 100$$

where A is the total number of the elements $E_1$ to $E_n$ and $a_i$ is the number of a certain element $E_i$. The total percentage $P_T$ is the sum of the percentages $P_2$ to $P_n$ ($P_T = P_2 + \ldots P_n = (A - a_1)/A \times 100$).

Figure 5:
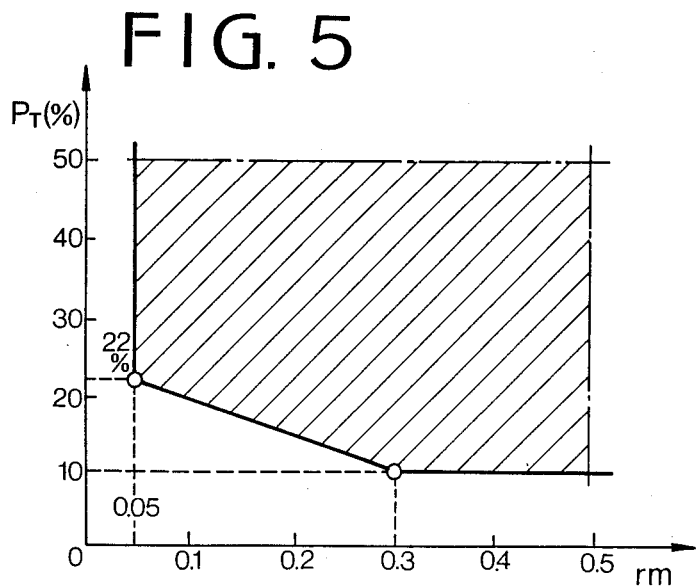
FIG. 5 is a graph showing a range of mixing of elements effective for reducing noises.
Figure 6:
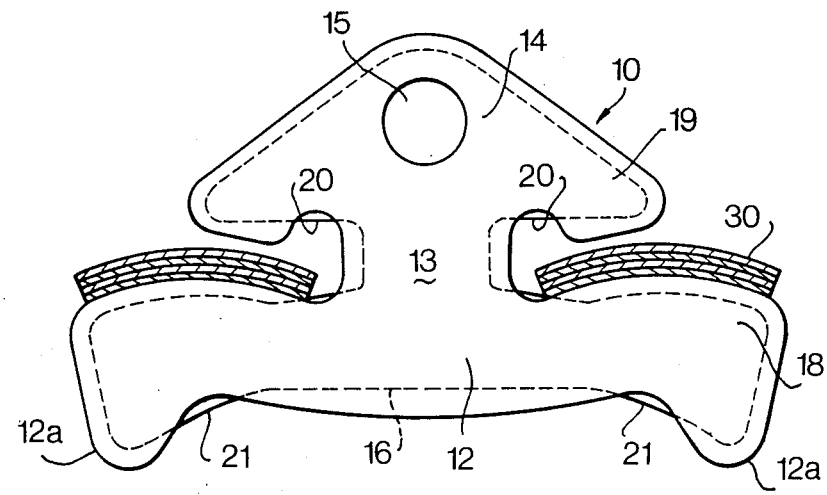
FIG. 6 is an elevational view of an element of a belt of another embodiment.
Figure 7:
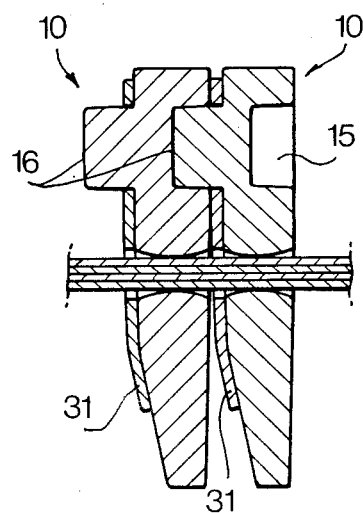
FIG. 7 is a sectional view of the elements of FIG. 6.

A hatched area in FIG. 5 shows a range where noise is decreased in relation to the minimum difference ratio $r_m$ and the total $P_T$. A borderline in FIG. 5, connecting points indicated by $P_T = 22$, $r_m = 0.05$ and $P_T = 10$, $r_m = 0.3$, is a line connecting percentages of each ratio on a noise-reduction limit line in FIG. 4.

The above-described conditions for reducing noises of the belt of the present invention can be summarized as below:

(a) Two or more kinds of elements $E_1$ to $E_n$ are distributed at random.

(b) The minimum ratio $r_m$ of the difference of thicknesses of elements is in the range of 0.05 and 0.5.

(c) The percentage $P_T$ of elements excluding the elements $E_1$ is in the range of 10 to 50%.

(d) When the minimum ratio $r_m$ is between 0.05 and 0.3, the minimum percentage $P_T$ is 22% at the ratio 0.05 and linearly decreases to 10% at the ratio 0.3.

FIGS. 6 to 9 show another embodiment of the present invention. The same numerals as those in FIGS. 1 to 3 designate the same parts.

Figure 8:
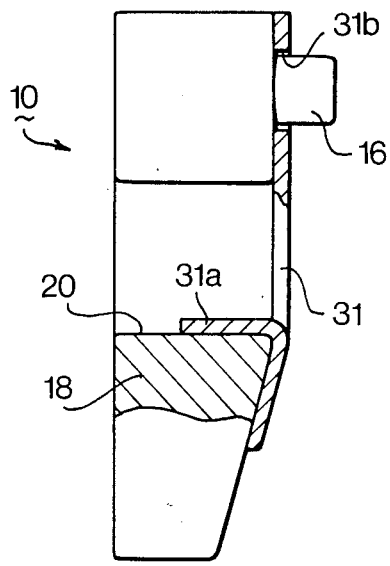
FIG. 8 is a partially cut-away side elevational view of the element of FIG. 6.
Figure 9:
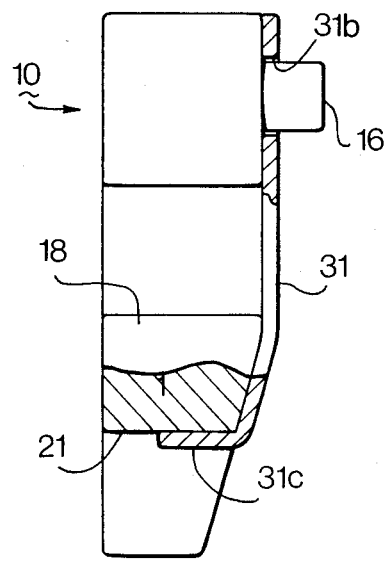
FIG. 9 is a partially cut-away side elevational view of a modification of the element of the second embodiment.

In the present embodiment, elements of equal thickness are used. However, in order to increase the thickness of an element, an adjustment sheet 31 is attached to the element in accordance with the combination of thickness. The shape of the sheet is similar to the element 10 in elevation as shown by a dotted line in FIG. 6. The size is slightly smaller than the element 10 so as not to rub the pulleys or carriers. Referring to FIG. 8, each adjustment sheet 31 has an opening 31b in which the projection 16 of the element 10 is engaged. The adjustment sheet 31 is fixed to the element 10 by a pair of pawls 31a which are engaged to recesses 20 of the element 10. Alternately, a pair of pawls 31c may be provided to engage recesses 21 at the bottom of the element 10 as shown in FIG. 9.

Thus, the thickness t of the element 10 referred to in the previous embodiment corresponds to a sum of thicknesses of the element 10 and the adjustment sheet 31 in the present embodiment. In order to provide a belt with elements in three or more different thicknesses, several kinds of adjustment sheets may be used. Further, two or more sheets of equal thickness may be attached to an element.

Although the number of the thickest element $E_1$ is larger than the remainder in the embodiments, it is possible to set the number of another element than the thickest element to a maximum value.

While the presently preferred embodiments of the present invention have been shown and described, it is to be understood that this disclosure is for the purpose of illustration and that various changes and modifications may be made without departing from the spirit and scope of the invention as set forth in the appended claims.

What is claimed is:

1. A belt drive device comprising
   a drive pulley, a driven pulley, carrying means, and a belt composed of a plurality of metal elements arranged on said carrying means and engaged with both said pulleys, said elements comprise at least two kinds of elements which are divided along thickness, percentage of the largest number of one of the kinds of elements being at least fifty percent, ratio of difference of thicknsses between the thickest kind of the elements and a subordinate kind of the elements is in a range of 0.05 and 0.5, except a range lower than a line connecting a point of 22% at the ratio 0.05 and a point of 10% at a ratio 0.3, and all said elements are arranged at random.

2. The belt according to claim 1 wherein thickness of said element is adjusted by attaching a sheet to the element.

3. A belt drive device according to claim 1, wherein said 22% and 10% are percentages of the total number of the elements excluding said one kind of the elements.

4. A belt drive device according to claim 1, wherein said carrying means comprises a plurality of laminated layers of flexible thin strips disposed in a recess on both sides of each element between ears and shoulders of each element.

5. A belt drive device according to claim 1, wherein said thickness of the elements represents a value at a maximum thickness portion of the elements and said ratio of difference of the thicknesses between the thickest element and the subordinate element being defined as the difference of the thicknesses between the thickest element and the subordinate element divided by the thickness of the thickest element.

6. A belt drive device according to claim 1, wherein said elements include an element portion and an adjustment sheet having a shape similar to the element portion in elevation and size slightly smaller than the element portion so as not to rub said pulleys and said carrying means, said thickness of an element being the thicknesses of the element portion and the adjustment sheet.

7. A belt drive device according to claim 6, wherein each of said element portions of all of said kinds of elements have the same thickness, and the thicknesses of the adjustment sheets of the different kinds of elements are different.

8. A belt drive device according to claim 6, wherein said adjustment sheet comprises at least one sheet.

9. A belt drive device according to claim 8, wherein p1 said at least one sheet comprises at least two sheets of equal thicknesses.

10. A belt drive device according to claim 6, wherein each said element portion has a projection at an upper part of said element portion on one side thereof and a dimple on the other side in which dimple said projection of an adjacent element portion engages, said adjustment sheet having an opening in which said projection extends, said adjustment sheet being fixed to said element portion by a pair of pawls engaging said element portion at a lower end of said element portion at recesses at said lower end.

11. A belt drive device according to claim 1, wherein said elements being arranged at random in accordance with a table of random numbers.

12. A belt drive device according to claim 1, wherein said elements decrease in thickness from their top to bottom.

13. A belt drive device according to claim 1, wherein said one kind of the elements is the thickest kind of the elements.

14. A belt drive device according to claim 13, wherein said subordinate kind of the elements is that kind of the elements having a thickness next smallest to the thickness of the thickest kind of the elements.

15. A belt drive device according to claim 14, wherein said 22% and 10% are percentages of the total number of the elements excluding the thickest kind of the elements.

16. A belt drive device according to claim 1, wherein said subordinate kind of the elements is that kind of the elements having a thickness next smallest to the thickness of the thickest kind of the elements.

* * * * *